May 15, 1928. 1,669,826
C. T. HANSEN
VEHICLE BODY CONSTRUCTION
Filed Sept. 22, 1922 8 Sheets-Sheet 4
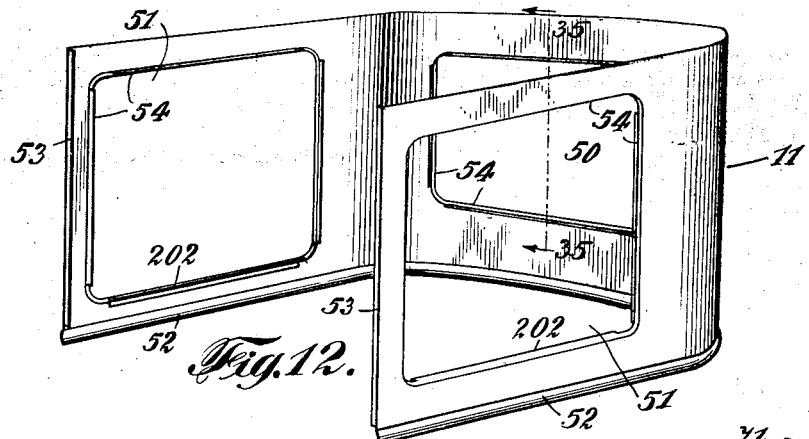
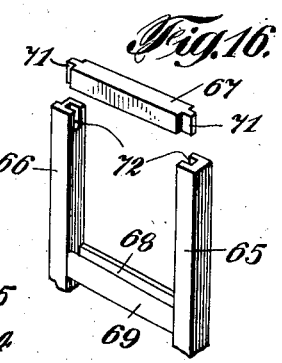
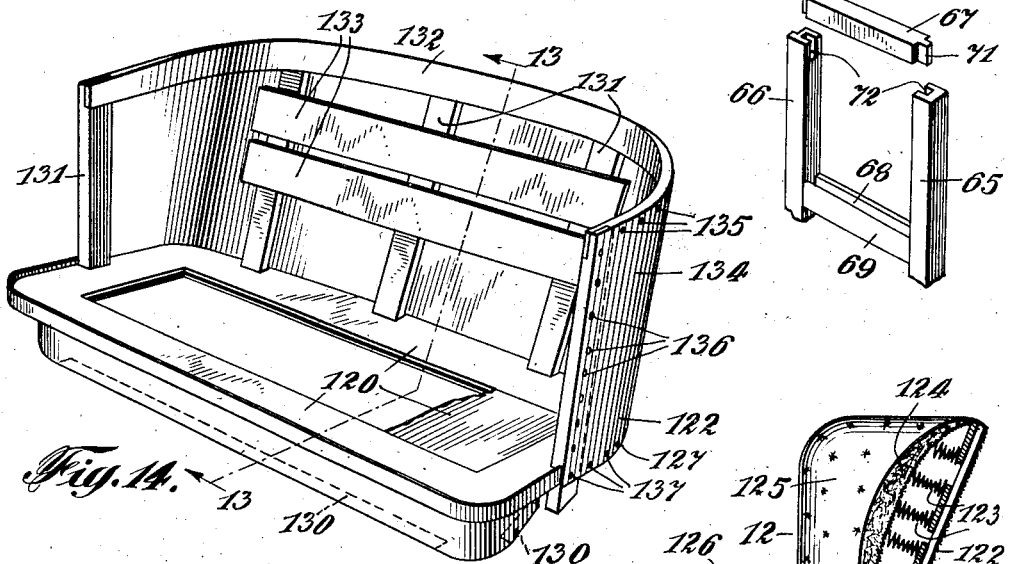
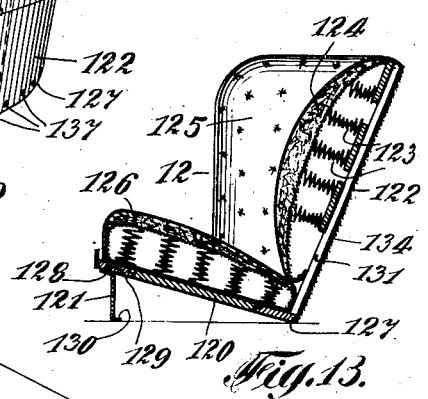
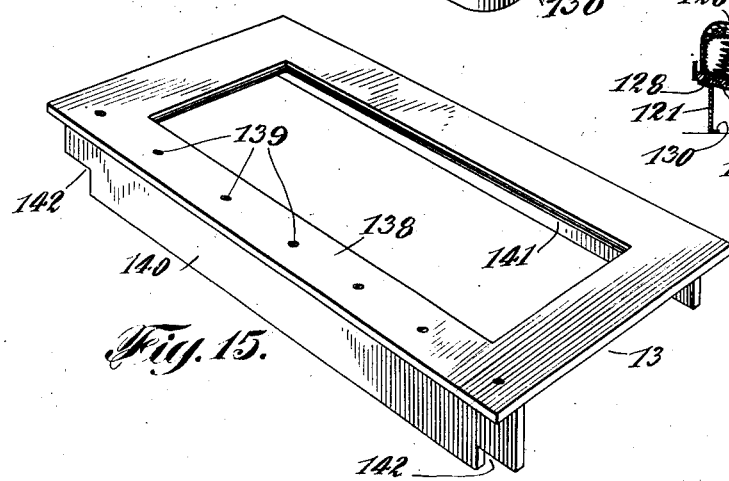
Inventor
C. T. Hansen
Attorney

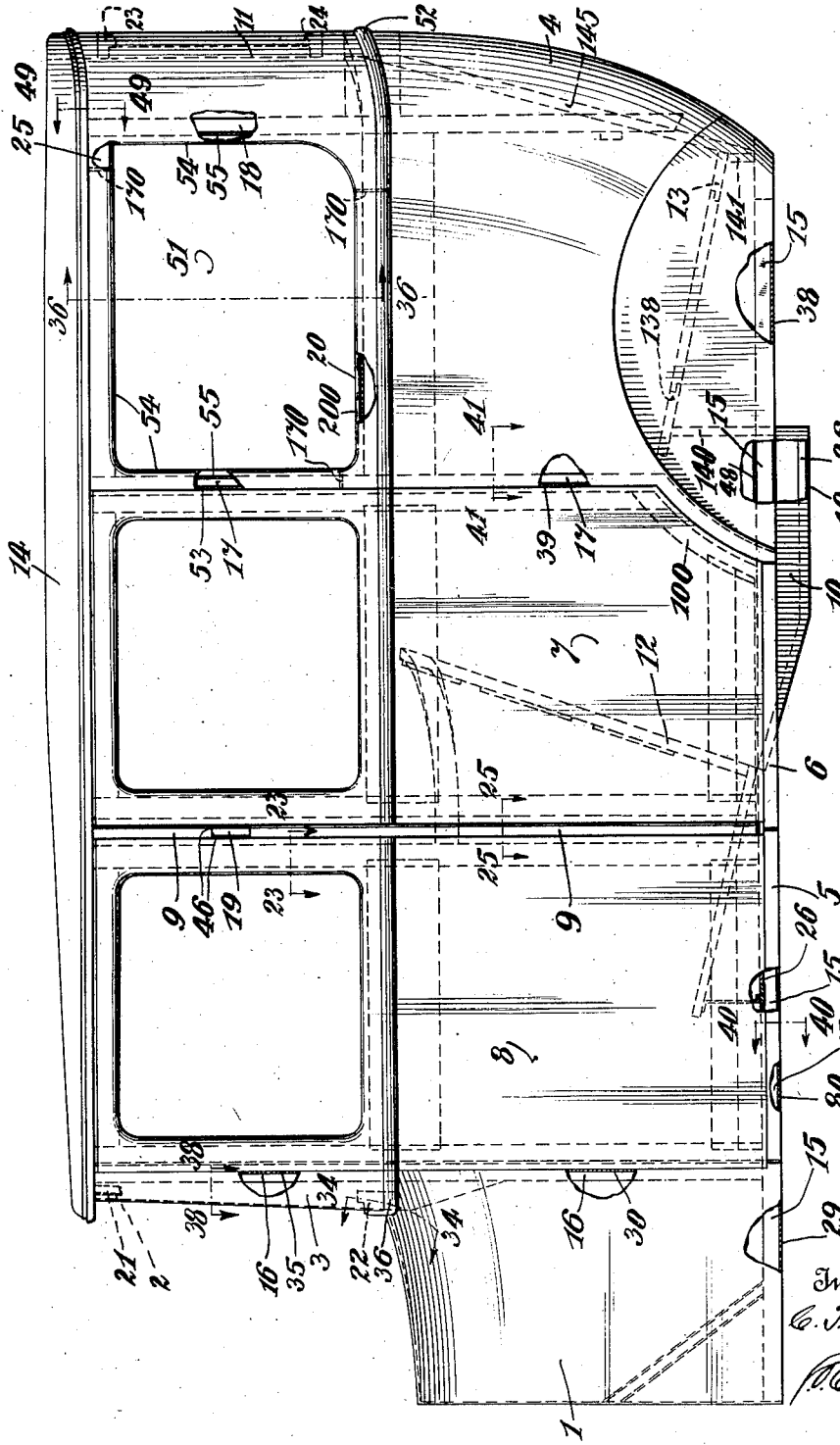

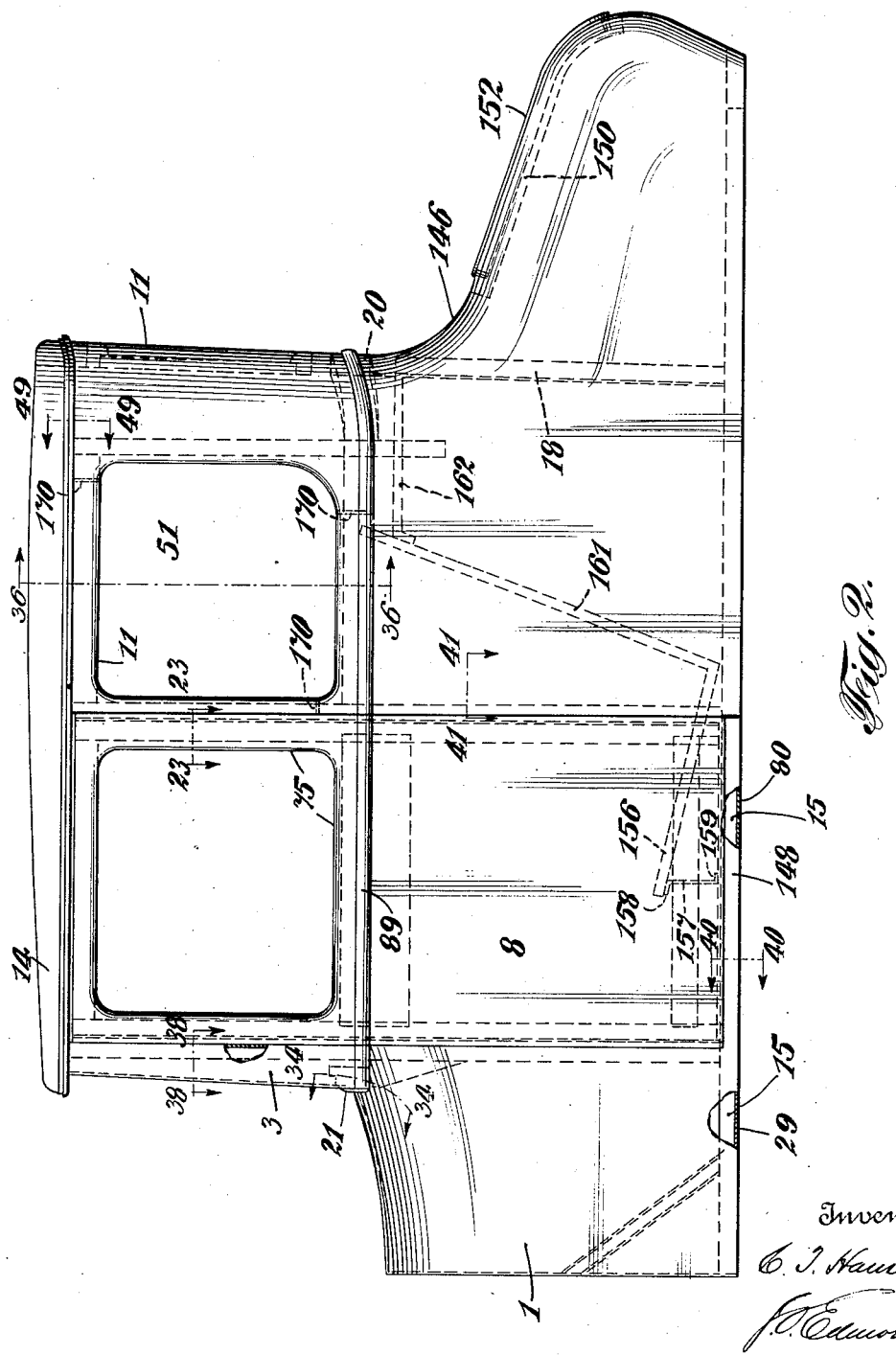

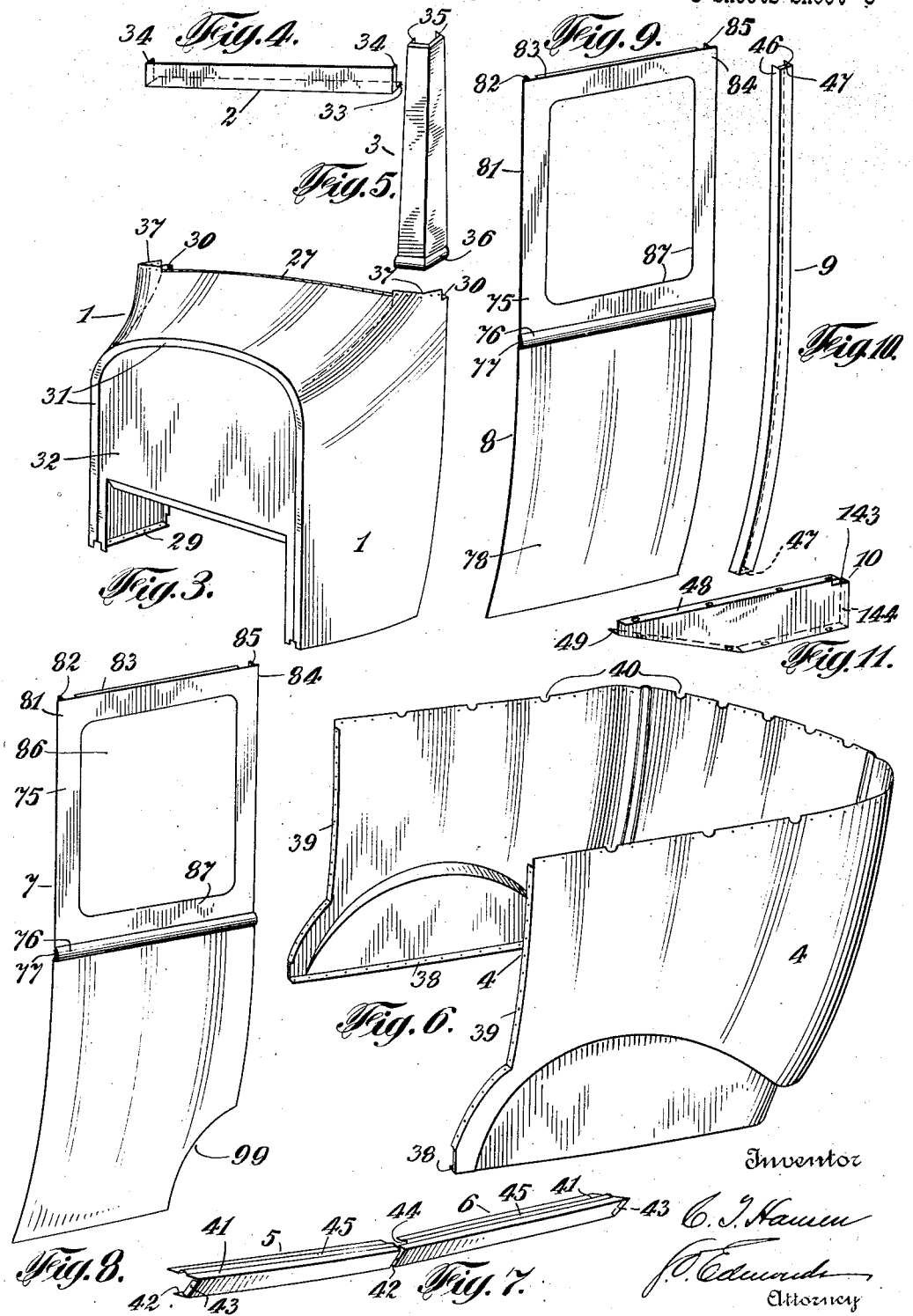

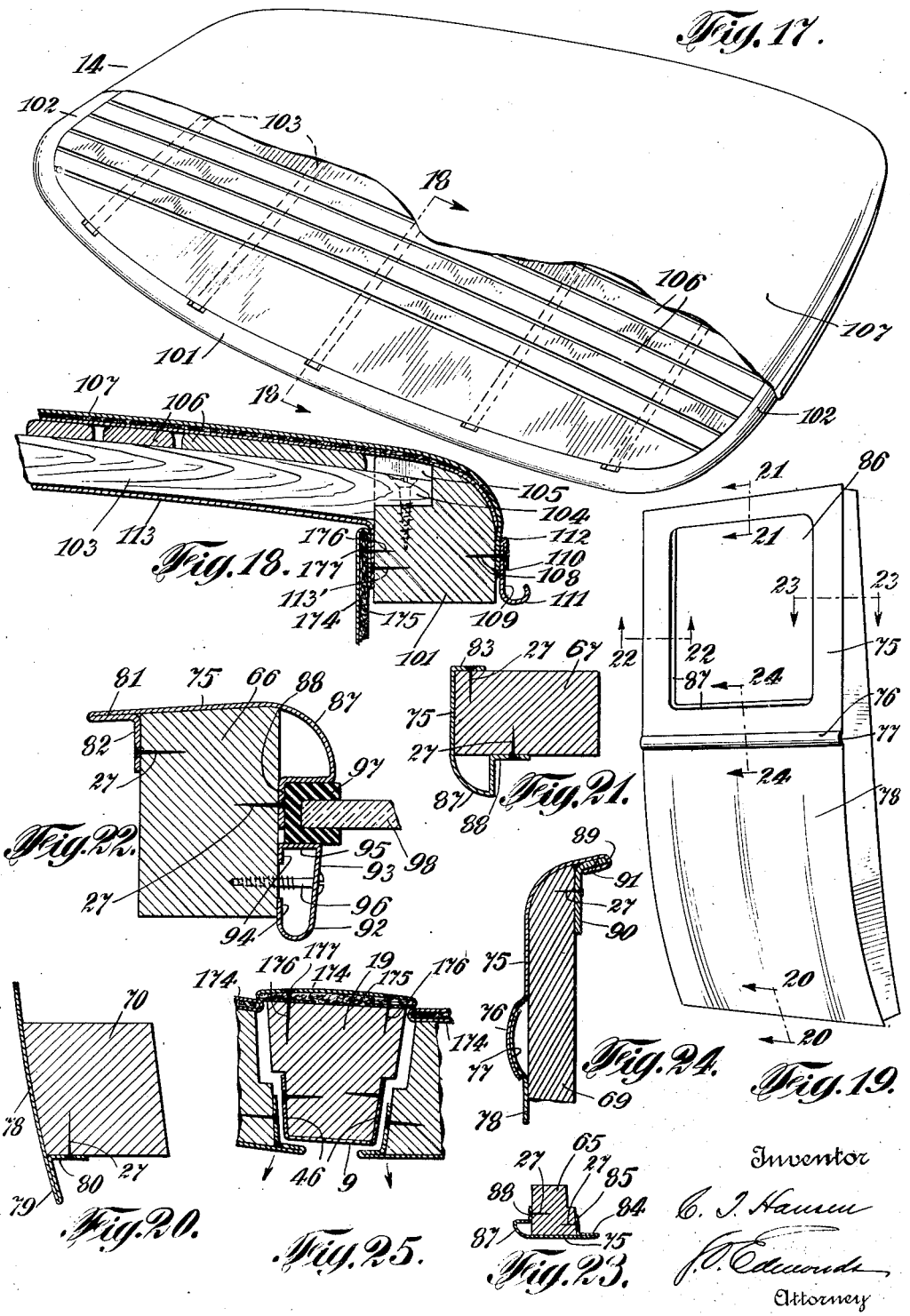

May 15, 1928.
C. T. HANSEN
1,669,826
VEHICLE BODY CONSTRUCTION
Filed Sept. 22, 1922
8 Sheets-Sheet 6
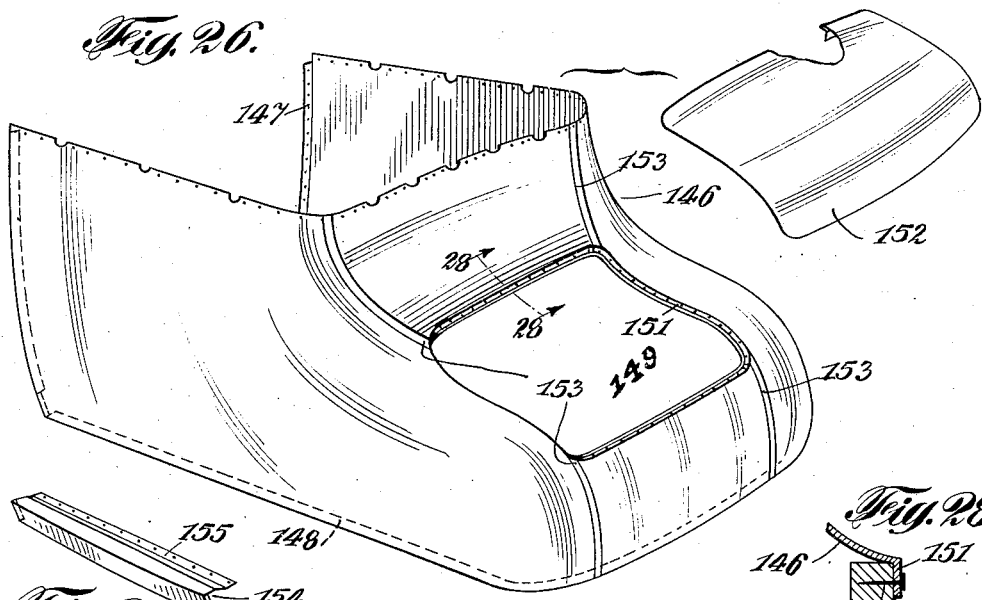
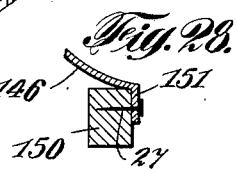
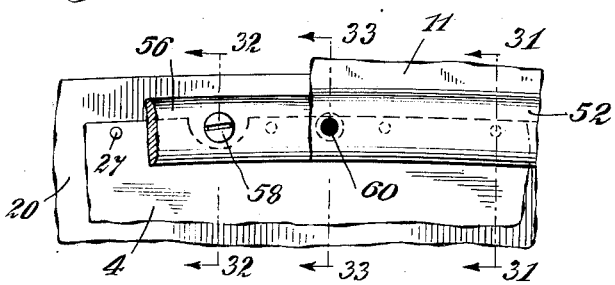
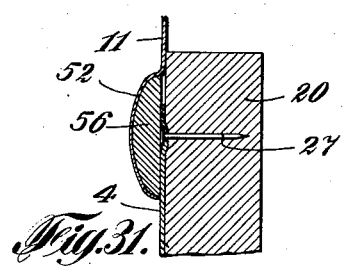
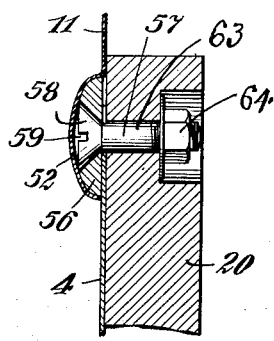
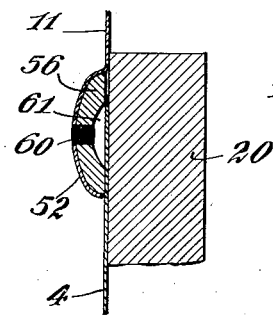
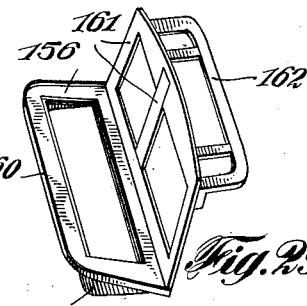

May 15, 1928.                    C. T. HANSEN                    1,669,826
                            VEHICLE BODY CONSTRUCTION
                            Filed Sept. 22, 1922                 8 Sheets-Sheet 7
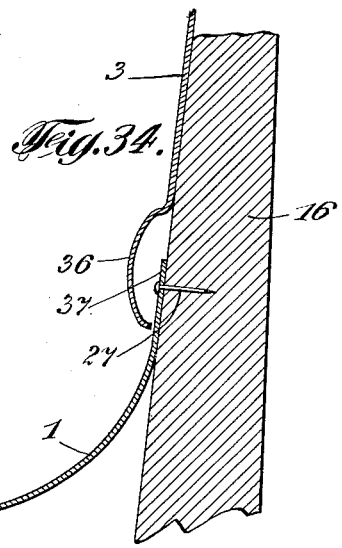
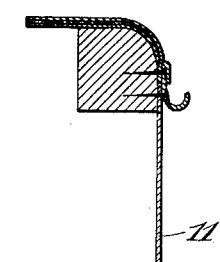
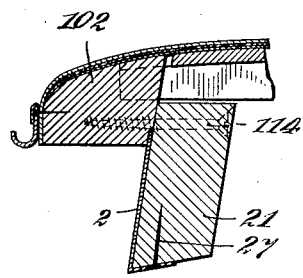
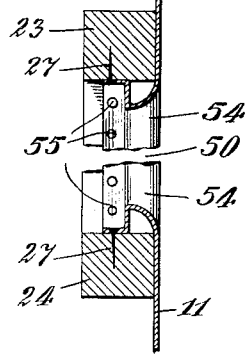
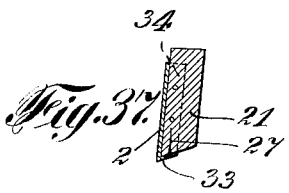
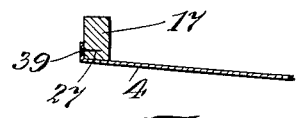
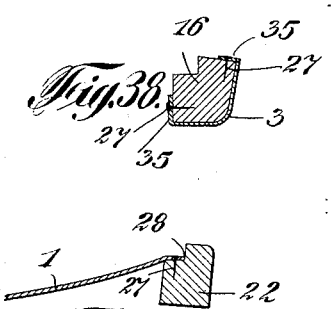
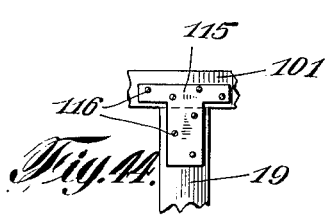
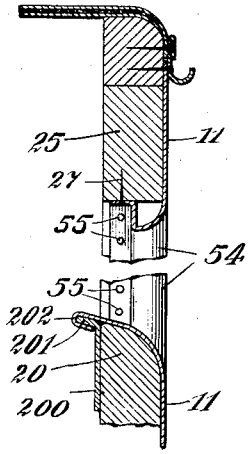
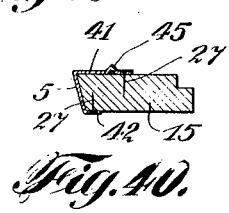
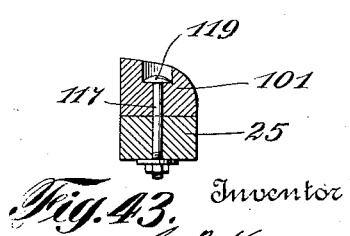

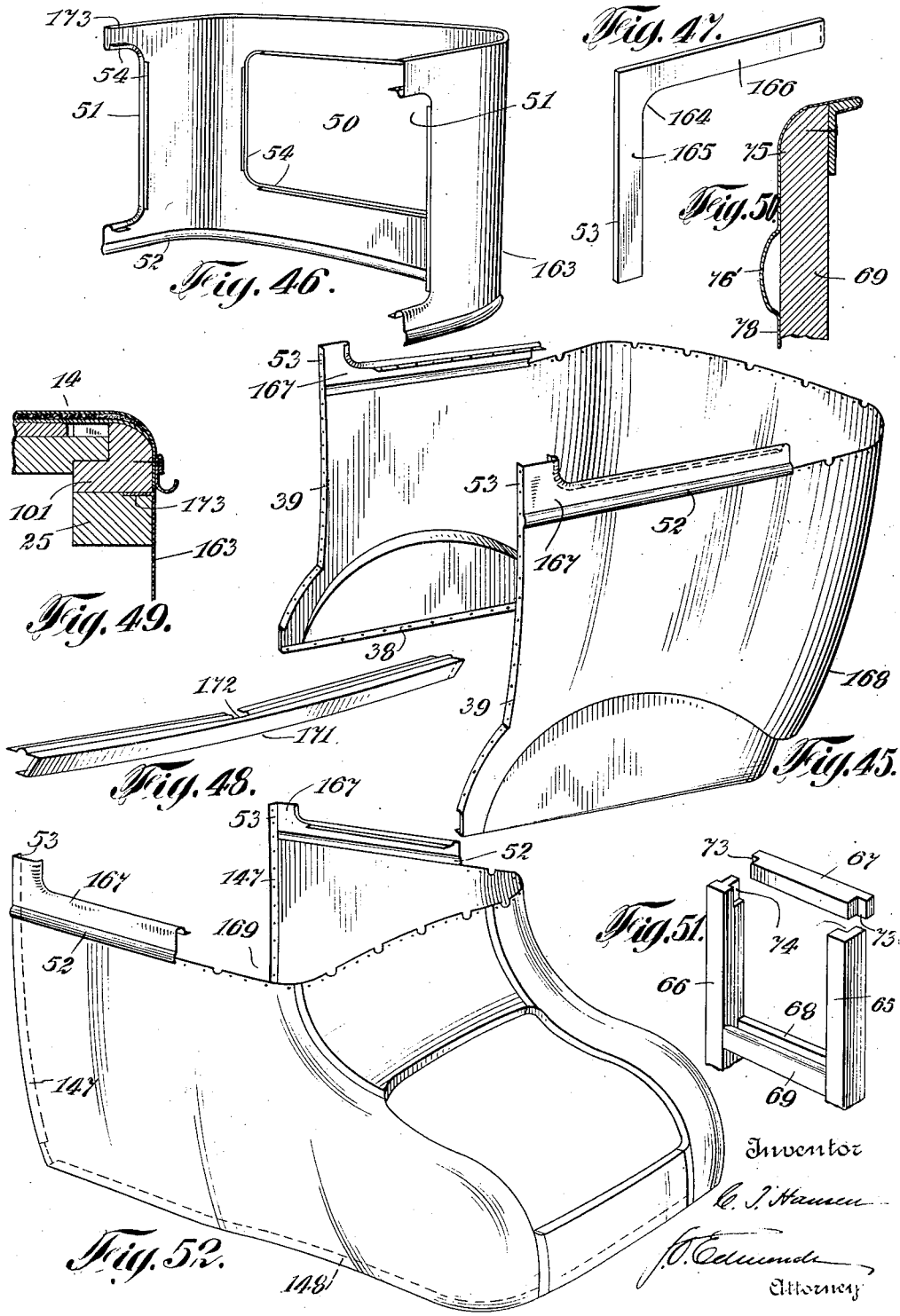

Patented May 15, 1928.

1,669,826

UNITED STATES PATENT OFFICE.

CONRAD T. HANSEN, OF PHILADELPHIA, PENNSYLVANIA, ASSIGNOR TO AMERICAN MOTOR BODY COMPANY, OF PHILADELPHIA, PENNSYLVANIA, A CORPORATION OF DELAWARE.

VEHICLE BODY CONSTRUCTION.

Application filed September 22, 1922. Serial No. 589,752.

This invention relates to improvements in vehicle body construction.

The principal object of this invention is to provide a method of constructing vehicle bodies, whereby bodies, such as those suitable for pleasure automobiles, taxi-cabs, auto buses, or other types, may be built at a small cost and with a small amount of labor, and whereby such bodies may be manufactured in large quantities within a limited time. Another object of this invention is to provide a body construction which requires only a small amount of shop space, which simplifies the work of construction, and which facilitates doing a maximum amount of the required operations by machinery, thus lessening the amount of skilled labor required for the production of the bodies. Another object of my invention is to provide a body construction which eliminates seam welding to a great extent and soldering entirely, thus avoiding a great amount of filing and finishing operations necessary with seam welding, and avoiding the expense and likelihood of injury from corrosion incident to the employment of solder, as well as the numerous operations necessary for removing such solder and protecting the metal therefrom. A further object of my invention is to provide a body construction which permits of the building and completion of various body units separately and before their assembly into the final structure, and a construction which permits these units to be assembled in place easily, quickly and securely, with a minimum risk of injury to such units or to the paint or enamel or finish thereon. Another object of my invention is to provide a construction which permits of greater variations in the structure of the component parts or body units, so that it is not necessary to work so close in assembling, thus reducing labor costs of production and the time which would otherwise be required therefor. Other objects will be in part obvious and in part pointed out hereinafter.

In accordance with my invention, I construct a plurality of separate, complete, component parts or body units, and then assemble these units into the final structure. Some of these separate parts or body units may consist of suitable stampings of sheet metal, or other material capable of being formed into shape, which provide the paneling of the body. Preferably these stampings or formations are suitably formed with flanges so that they may easily and quickly be attached to the body frame members or to each other without requiring flanging by hand and may be finished, even as to painting or enameling, and be equipped with fittings and trimming and upholstery, before being assembled into the body. Such units permit the doing of as little or as much of the preliminary work on them as may be found desirable. Obviously, the various panel or body units vary according to the particular type of body which is to be constructed, and may be modified at will. Such component parts or body units lend themselves readily to be produced in quantities and constitute practically standard parts which may be used interchangeably in bodies of the same or different types.

In order that a clearer understanding of my invention may be had, attention is hereby directed to the accompanying drawings, forming a part of this application, and illustrating certain possible embodiments of my invention. Referring to the drawings, Fig. 1 is a side elevation of an automobile body of the sedan type embodying my invention, certain parts being shown in dotted lines, and some of the paneling being broken away, to more clearly illustrate certain details of the construction; Fig. 2 is a view similar to Fig. 1, but shows an automobile body of the coupé type embodying my invention; Fig. 3 is a perspective view of a cowl panel and dash unit, such as is assembled in both the sedan and coupé types of bodies; Fig. 4 is a perspective view of a windshield header panel unit which is applied across the top of the wind shield in both types of bodies; Fig. 5 is a perspective view of a front corner pillar panel unit, such as extends vertically at the front corners of both types of bodies; Fig. 6 is a perspective view of a tonneau panel unit which constitutes the lower part of the rear of the body of the sedan type;

Fig. 7 is a perspective view of two panel members constituting respectively a front door threshold strip and a rear door threshold strip in the sedan type of body; Fig. 8 is a perspective view of a completed door panel unit comprising assembled separate upper and lower panel units, and before assembly on its frame to provide a rear door unit for the sedan type of body; Fig. 9 is a perspective view of a completed door panel unit comprising assembled, separate upper and lower panel units, for a door unit suitable for both types of bodies; Fig. 10 is a perspective view of a lock post panel unit for the lock post of the sedan type of body; Fig. 11 is a perspective view of a floor board supporting panel unit, such as is applied on each side of the sedan type of body to support the tonneau floor boards; Fig. 12 is a perspective view of a completed panel unit in a preferred form such as is shown in full lines in Figs. 1 and 2 assembled in the construction at the upper part of the rear portion of the bodies; Fig. 13 is a sectional view of a completed seat unit, with upholstery attached, suitable for the front seat unit in the sedan type of body; Fig. 14 is a perspective view of this seat unit with the upholstery elements removed; Fig. 15 is a perspective view of a rear seat unit for the sedan type of body, showing the frame and supporting members therefor; Fig. 16 is a perspective view of a portion of the framework of a door unit, the parts being shown separated in order to more clearly illustrate their relative adjustability; Fig. 17 is a perspective view of a completed roof unit, certain parts being broken away to more clearly bring out details of the construction; Fig. 18 is a sectional view taken on the line 18—18 of Fig. 17, and shows trimming material attached in place; Fig. 19 is a perspective view of a completed door unit which may be embodied in the coupé body or as a front door in the sedan body; Figs. 20, 21, 22, 23 and 24 are sectional views taken respectively on the lines 20—20, 21—21, 22—22, 23—23, and 24—24 of Fig. 19 showing the method of attaching the door panel unit to the door frame members, the glass and finish moulding being shown in Fig. 22; Fig. 25 is a sectional view taken on the line 25—25 of Fig. 1, showing the lock post between the two adjacent doors of the sedan type of body with its panel unit applied thereto, and trimming applied to the interior of the post and door; Fig. 26 is a perspective view of a formed panel unit which constitutes the rear lower portion of the body of the coupé type, the back cover being shown separated from the usual rear opening provided in the unit; Fig. 27 is a perspective view of a threshold strip applied across the doorway in the coupé type of body; Fig. 28 is a sectional view taken on the line 28—28 of Fig. 26; Fig. 29 is a perspective view of a seat unit suitable for the coupé type of body; Fig. 30 is a detailed plan view showing the method of joining two abutting panel sections along a belt moulding, certain of the parts being broken away in order to more clearly illustrate the construction; Fig. 31 is a sectional view taken on the line 31—31 of Fig. 30; Fig. 32 is a sectional view taken on the line 32—32 of Fig. 30; Fig. 33 is a sectional view taken on the line 33—33 of Fig. 30; Fig. 34 is a sectional view showing the method of joining the cowl panel unit to a front panel unit along a belt rail moulding and is taken on the lines 34—34 of Figs. 1 and 2; Fig. 35 is a vertical section of the back panel unit, taken on the line 35—35 of Fig. 12, through the rear window opening, the parts being shown broken away and the unit assembled on the body frame; Fig. 36 is a vertical sectional view through the upper tonneau panel unit at the rear quarter window, and is taken on the line 36—36 of Figs. 1 and 2; Fig 37 is a vertical sectional view through the windshield header panel unit mounted on the body frame; Fig. 38 is a horizontal section through the front corner post and panel unit thereon, and is taken on the line 38—38 of Figs. 1 and 2; Fig. 39 is a vertical section taken through the horizontal body frame member at the bottom of the windshield showing the cowl panel unit attached thereto; Fig. 40 is a vertical section taken through a side sill of the body frame showing the threshold panel unit secured thereto, and is taken on the line 40—40 of Figs. 1 and 2; Fig. 41 is a horizontal section section through a rear standing hinge post and a panel unit attached thereto, and is taken on the lines 41—41 of Figs. 1 and 2; Fig. 42 is a view showing the method of attaching the front of the roof unit to the windshield header of the body frame; Fig. 43 is a sectional view showing the method of securing a rail of the roof unit to an upper horizontal rail of the body frame; Fig. 44 is a side view showing the method of attaching a side frame member of the roof to a post of the body frame; Fig. 45 is a perspective view of a modified tonneau panel unit for the lower part of the rear of the sedan type of body; Fig. 46 is a perspective view of a modified panel unit for the upper part of the rear of both types of bodies; Fig. 47 is a perspective view of a panel unit for the front and upper margin of the side quarter window opening of both types of bodies; Fig. 48 is a perspective view of a threshold strip unit for the sedan type of body and is designed to extend across both doorways; Fig. 49 is a sectional view taken on the line 49—49 of Figs. 1 and 2; Fig. 50 is a sectional view of a modified form of door panel unit mounted on a door, and except for the form of panel unit is similar to Fig. 24; Fig. 51 is a perspective view of the top of a modified form of door frame construction; and Fig. 52 is a perspective view of a modified form of panel unit for the lower rear portion of the coupé type of body. Similar reference characters refer to similar parts throughout the several views of the drawings.

Throughout all the drawings the panels and formed portions are to be understood as representing either metal or any other material capable of being applied as panels or formed into shape, and the description herein is to be similarly understood.

Referring to the drawings, for the sedan type of body (Fig. 1) I may provide the following completely constructed component panel units separately; a cowl panel unit 1, (Fig. 3); a horizontal windshield header panel unit 2 (Fig. 4) to extend across the body over the windshield; vertical front pillar panel units, such as 3 (Fig. 5), one for each front door hinge post of the body above the cowl unit 1; a tonneau panel unit 4 (Fig. 6) for the lower part of the rear portion of the body; threshold panel units, one, such as 5, for each front doorway, and one, such as 6, for each rear doorway of the body; rear door panel units, such as 7, (Fig. 8); front door panel units, such as 8 (Fig. 9); vertical panel units, such as 9 (Fig. 10), for standing lock posts between the doorways; panel units such as 10 (Fig. 11) for each side of the tonneau to support floor boards; and a panel unit 11 (Fig. 12) for the upper part of the rear portion of the body. The above units provide the main part of the paneling of the body. In building the body, these panel units are secured in place on a wooden framework, which may comprise suitable frame members first attached to the panel units and then secured on the chassis, or the panel units may be mounted on a body frame which has been assembled previously. Preferably the door panel units are assembled upon door frames to form complete door units which are then attached to the body. As other separate and complete body units I provide a front seat unit 12 (Fig. 13); a rear seat unit 13 (Fig. 15); and a roof unit 14 (Fig. 17).

The body framework, preferably wooden, upon which these panel units are mounted include the following frame members; side sills such as 15; front standing hinge posts such as 16; rear standing hinge posts such as 17; rear posts such as 18; standing lock posts such as 19; belt rail 20; front top cross rail or windshield header 21; front middle cross piece 22; rear top cross rail 23; rear middle cross pieces 24 and side top rail such as 25. Floor boards 26 may be supported in place by the side sills 15 in the usual manner and also by panel units 10. The above frame members are preferably assembled and joined together in any ordinary manner before the panel units are assembled in the body, and constitute a body frame of the ordinary form, except that the members which are adjacent a window opening are not flanged, as usual, to provide runways for the glass, since these runways may be supplied directly by certain of the panel units in the manner to be described hereinafter. The various panel units, such as those above mentioned, are preferably made up of stamped sheet metal or of other material which may be formed to shape, and are formed to the final shape desired, and all flanges or edges are completely formed in the dies to the proper angle, so that they will fit properly to the woodwork of the body frame. These panels after shaping and flanging, and before being assembled in the body, may be enameled or painted or otherwise be completed even as to fittings, upholstery, trimming and the like. The assembly of these units upon the framework may be easily accomplished by placing the units separately in the proper locations on the body frame and securing them thereto by any suitable means, such as by means of nails 27, or the like. Since these panels have been suitably flanged, it is not necessary to reflange any part of the material by hand work, as is the usual custom, and thereby the consequent possibility of injuring the paint or enamel on the panel units is eliminated.

For instance, the cowl panel unit 1 (Fig. 3) is formed with the upper horizontal flange 28 arranged to overlap the upper surface of the front middle cross piece 22, and to be secured thereto by nails 27 (Fig. 39), and with flanges 29 arranged to lap under the side sills 15, (Figs. 1 and 2), and with inner vertical flanges 30 which are arranged to come against the rear surface of the front corner body posts 16 and be nailed thereto, and with a front flange 31 which overlaps the edge of a dash plate 32, which may be secured to this flange by welding, bolting, or the like. The horizontal panel unit 2 for the windshield header is formed with a lower flange 33 and end flanges 34, which are formed to fit respectively against the lower surfaces and ends of the windshield header 21 and are adapted to be secured thereto by nails 27 (Fig. 37). The vertical front post panel units, such as 3, are shaped to fit about the front and outer sides of each of the front standing hinge posts, such as 16, and are provided along each edge with flanges 35 arranged to lie against surfaces of the post 16 and to be secured thereto by nails 27 (Fig. 38). The lower edges of units 3 have a pressed-in moulding 36, which is arranged to overlap the upper rear corners 37 of the cowl unit which are arranged for attachment to posts 16. The tonneau panel unit 4, for the lower part of the rear portion of the body, is formed with one or more bottom flanges 38 which are arranged to fit against the side sills, such as 15, and in position to be nailed or otherwise secured thereto. This panel unit also has front vertically extending flanges 39 arranged to abut against surfaces of the rear standing hinge posts, such as 17, and to be secured thereto by nails 27 (Fig. 41). The upper edge of this panel is also preferably provided with nail holes so that it may be attached to the belt rail 20. Threshold panel units, such as 5 and 6, are formed in channel shape and each is arranged to receive a side sill 15 snugly within the channel between its upper flange 41 and its lower flange 42 (Fig. 40). When so positioned, the flanges 41 and 42 may be secured to the sill 15 by means of nails 27. Each strip preferably has a carriage joint flange 43 at its outer end and strip 6 has an end recess 44 for post 19. If desired, each threshold strip may be shaped to provide a bead 45 across each doorway. Panel unit 9 is also of channel shape and is formed to snugly receive the lock post 19 between its flanges 46, with these flanges in position to be secured thereto by nails 27 (Fig. 25). The top and bottom of panel 9 also have carriage joint flanges 47. The panel unit 10 for the tonneau floor boards is Z-shaped in cross section, the top flange 48 being arranged to overlap and to be secured to side sill 15, and the lower flange 49 being arranged to support the ends of floor boards 26. The panel unit 11 for the upper part of the rear portion of the body is formed to include the back and sides, including the rear window opening 50 and the side quarter window openings 51. This unit is provided with a pressed-in belt rail moulding 52 extending along its lower edge. The front edges of this panel are provided with vertical flanges 53 which are arranged to lie against and be secured to the front surfaces of rear hinge posts 17. Around each window opening the panel has window retaining shoulders or flanges 54, and extending inwardly of flanges 54 are flanges 55 which are formed to fit against the frame members, such as belt rail 20, top rails 25 and 23, rail 24, and posts 17 and 18, which are adjacent the window openings. These flanges may be secured to these frame members by nails 27 (Figs. 35 and 36). If the windows are to be arranged for opening and closing, a retaining strip 200 having a flange 201 is secured to the inside of belt rail 20 (Fig. 36) and the adjacent edge of the panel is bent over the top of the belt rail and is doubled over the flange 201 of piece 200 as at 202.

It is now apparent that these panel units may readily and easily be assembled in the body by placing each unit in proper position upon the frame members which the particular panel unit has been formed to fit, and then securing the panel unit to the body frame members by means of nails 27, or other means. The nails are preferably placed through suitable nail holes provided in the securing flanges and at such other places on the panel units where attachment to body frame members is desired. As above stated, these panel units are preferably constructed complete before being assembled upon and secured to the body frame. Obviously, instead of building a body frame having the frame members above referred to, separate frame members may be attached to each of the panel units separately and before assembly into the final structure. In this event, the frame members for each unit are attached to the proper flanges of the panel units, and then these separate and completed panel units, with their attached frame members, are assembled together to form the body. These frame members when so assembled together form a body frame.

I have provided a novel method of joining two panels together along a moulding, whereby it becomes unnecessary to provide and apply the usual applied moulding, thus saving the incident time and expense, and avoiding the necessity of drilling and burring for nails and file finishing the moulding. This joint also serves to conceal the nails or screws or other means whereby the panels are attached to a frame member at this place.

In the drawings a joint of this type is shown where the upper edge of the tonneau panel unit 4, comprising the lower part of the rear of the body, meets the lower edge of the panel unit 11, which constitutes the upper part of the rear portion of the body. A similar joint is also shown where the front pillar panel units 3 meet and overlap the cowl unit 1.

Referring to Figs. 30–33, the lower edge of the upper panel unit 11 is provided with the pressed-in moulding 52 which overlaps the flat upper edge portion of the lower panel unit 4, which edge is secured to the wooden belt rail 20 of the body frame by means of nails 27. Before unit 11 is placed on the body, a metal reenforcing strip 56, carrying bolts 57, which penetrate the strip and have their heads 58 seated in suitable recesses 59 therein, is placed within the pressed-in moulding 52 of the unit and is welded or otherwise secured thereto at suitable points, as at 60, strip 52 being suitably counterbored at these points, as at 61, to secure better welding or attachment. This unit 11 is now placed on the body frame with its moulding portion 52 overlapping the upper edge of panel 4 and with the bolts 57 extending through suitable perforations or notches 40 in the panel 4 and through holes 63 in belt rail 20. By applying nuts 64 to the bolts both units become firmly secured together along a moulding, and the securing means are concealed. The nuts 64 are preferably countersunk into rail 20. If desired, the upper side portions of the cowl panel unit 1 may be joined to the lower ends of the front corner panel units 3 along a similar type of joint and in a similar manner. However, and as shown in Fig. 34, this type of joint may be modified by omitting the reenforcing strip 56 and bolts 57. As before mentioned both members 1 and 3 are secured to post 16. Upper edge 37 of panel 1 may be nailed to post 16 by means of nails 27 and the moulding 36 of panel 3 may merely be positioned to overlap the edge 37 so as to conceal the nails 27. Neither type of joint and method is necessarily confined to the belt rail moulding. Either can be used as readily for a moulding in any part of the design of the car, as, for instance, up and down the rear corners, when two body panels meet therealong, or under the rear window, or wherever in working out the design of the car a moulding is utilized, or wherever there is a joint in the panels which needs to be covered with a moulding.

As further separate and complete units for assembly as such into vehicle bodies, I provide the doors. For each door I provide a door frame, comprising wooden frame members assembled together. This door frame (Fig. 16) comprises hinge post 65; lock post 66; upper cross piece or header 67; middle cross lock board 68 and belt rail 69, arranged to allow the window to slide up and down between them; and lower cross piece 70 (Fig. 20). In a preferred form the ends of header 67 provide tongues 71 which are adjustably received in slots 72 formed at the top of frame members 65 and 66. In a modified form (Fig. 51) header 67 has its ends rabbeted, as at 73, and removably interlocks with rabbeted portions 74 at the upper end of frame members 65 and 66. It is readily apparent that in either embodiment the door header 67 is adjustable relatively to members 65 and 66, and thereby permits of the application of the door panel units with ease and without injury thereto or to the finish which may have been previously given thereto.

For each of the front door units (Fig. 19) I provide paneling (Fig. 9) which is suitably formed to shape and flanged in the dies, so that it may quickly and easily be attached to the door frame, without requiring the reshaping or reflanging of any portion of this panel unit. This paneling preferably comprises an upper panel 75 along the lower edge of which is formed a belt rail moulding 76 which is arranged to overlap the similarly shaped upper edge 77 of a lower panel 78. This joint may be formed in other ways if desired. Also it is obvious that the door paneling may be formed of a single sheet and in this case, the moulding may be supplied by merely forming a pressed-in-portion 76' therein (Fig. 50). The lower edge of the paneling is doubled upon itself, as at 79 (Fig. 20) to overlap the door opening, and is provided with an inwardly extending flange 80, which is arranged to lap under the lower cross piece 70 and be secured thereto by means of nails 27. Along the hinge edge the paneling is formed with an extended doubled over flange 81 and an inwardly extending flange 82, which is arranged to overlap the door hinge post 66 and be nailed thereto as at 27 (Fig. 22). The upper edge of the door panel is formed with a horizontal flange 83, which is arranged to overlap the upper cross piece 67 and to be secured thereto by nails 27 (Fig. 21). The lock edge of the panel has an extended doubled flange 84 and an inwardly extending vertical flange 85, which is formed to overlap the door lock post 65 and to be secured thereto by means of nails 27 (Fig. 23). The upper unit 75 of the paneling is provided with a window opening 86. Around this window opening are formed window retaining shoulders or flanges 87 and with attaching flanges 88 which are arranged to fit snugly against the various door frame members, such as 65, 66, 67 and 69, and to be secured thereto by nails 27. The window retaining formations may be hollow or may be filled with strips of material, such as wood. As shown in Fig. 24, along the lower edge of the window opening 86, a window retaining flange 89 is provided by fastening, as with nails 27, a strip 90 of material along the top inner edge of belt rail 69, strip 90 having an inwardly extending flange 91 which is received within the fold of retaining shoulder 89. All these flanges are preferably provided with suitable nail holes so that when a panel unit is properly positioned on the door frame, the panel may readily and easily be secured to the frame by means of nails 27, without requiring reflanging or reshaping of the panel sections, and permitting of their being completely finished, including painting, enameling, etc. before attachment to the frame. The finish may, however, be applied after the panels are mounted on the frame, if desired. Glass moulding or retaining strips 92, of wood, metal, or other material, may also be applied. As shown in Fig. 22, these moulding strips 92 may comprise split boxlike strips, having outer walls 93, inner walls 94 arranged to rest against a frame member, such as 66, and an inner window retaining flange 95. Strips 92 may be held in place by screws 96 engaging wall 93 of the frame member. This method of mounting the glass in the window opening may be common to all the window openings of the doors and body. Such method saves one-half inch or more in the thickness of lumber required for the door pillars and body pillars, without reducing strength, for, instead of the old method of flanging over the metal paneling on the wood around a window opening by hand to form a part of the runway for the glass, according to my method, the panel itself is formed in the press to such shape that it will itself form part of the groove or runway for the glass, only needing in addition the application of the glass mouldings 92, and the felt, rubber or other channel members 97 for the protection of the edge of the glass 98.

The rear doors may be made in a manner similar to the above described construction of the front doors, having a similarly constructed door frame and a one-piece panel unit, or paneling comprising an upper panel 75 and a lower panel 76 (Fig. 8) constructed complete and then applied to the adjustable door frame by means of nails, or the like. The lower rear corner, however, of this paneling is cut away, as at 99, as is usual, and the door frame is correspondingly shaped, frame member 100 (Fig. 1) being supplied for this purpose. This rear door paneling also provides a window opening, as at 86, and is here provided with formed window retaining flanges 87 similar to those described in connection with the window opening of the front door paneling. Window glass may be applied to the rear door window opening in a manner similar to the application of the window glass to the front door construction.

It is to be noted that by providing the belt rail moulding in the manner above described the necessity of providing the usual applied moulding to the doors is eliminated, and the time and expense of applying such a moulding is avoided.

Instead of the usual method of assembling the woodwork of the roof complete and then applying the same to the body frame previous to paneling, finishing and trimming, I prefer to provide a completely constructed roof unit, which may not only comprise a complete frame, but also may include the fabric covering, the drip, or half oval moulding, and the interior head lining, all attached in place. Such roof unit may be assembled into the body either before or after paneling and painting, as may be desired, the attachment being possible by means of screw, bolts, brackets, mortise and tenons, or by other suitable means. The construction permits of such attachment without injury to any of the parts. This same method of construction and application applies as well to fabric covered roofs, or to metal covered roofs, or to those known as Agasote or Haskilite roofs, or to roofs of other construction or material, and irrespective of the type of body with which the roof is to be used.

Referring to Figs. 17 and 18, such a roof unit 14 may comprise a suitable wooden frame, including side rails 101, and rails 102, and wooden cross bows 103 extending between the side rails 101, with their ends 104 reduced and seated in suitable recesses 105 provided in the side rails. If desired ends 104 may be secured to the rails. Suitable slats 106 extend between the end rails 102 and rest on cross bows 103. Suitable covering material 107 is stretched over this construction, and is secured to the end rails 102 and to the side rails 101 by means of nails 108. A drip moulding 109 is placed about the outer periphery of the roof construction and is attached to the end rails 102 and to the side rails 101 by means of nails 110. This drip moulding 109 preferably comprises one or more stamped sheet metal strips presenting, when mounted, outwardly extending half oval drip flanges 111, and having doubled over portions 112 along their upper edges the inner portions of which are penetrated by the nails 110, and the outer portion overlying and concealing the nails 110. Head lining 113 may be applied to the under side of this roof construction and may be attached to cross bows 103 by any suitable means, and may have marginal portions overlapping the inner surfaces of the end rails 102 and the side rails 101, to which these portions of the lining may be secured by nails 113', brads, or other suitable means. As above stated, such a completed roof unit may be applied to the body frame by any suitable means. For instance, the front rail 102 may be secured to the windshield header 21 of the body frame by means of wood screws 114 (Fig. 42). The rear rail 102 may be attached to a rear top cross piece of the body frame in a similar manner. The side rails 101 may be attached to the standing lock posts 19, or other posts of the body frame by means of T-shaped brackets 115, which are secured to the two parts by means of wood screws 116 (Fig. 44). If desired, the rails of the roof may be attached to horizontal frame members of the body by means of bolts penetrating both parts. As shown in Fig. 43, the side rail 101 is attached to a top side rail 25 of the body frame by means of bolts 117 penetrating both members 101 and 25. In this case member 101 is preferably recessed, as at 118, to receive the bolt head 119.

Referring to Figures 13 and 14, the front seat, including the stool 120, the heel board 121, the back 122, spring work 123, padding 124, and final covering 125, is finished complete outside of the body and afterwards applied thereto as a separate and completed unit. A seat cushion 126 of any usual construction is also provided. The seat stool 120 is preferably of wood. Its rear edge 127 may be arranged to rest on the floor boards of the body. The upper edge of heel board 121 is provided with an outwardly extending flange 128, which is secured to the lower surface of the board 120 adjacent its front edge by means of nails or wood screws 129. The lower edge of heel board 121 is provided with inwardly extending flanges 130 which are adapted to rest upon floor boards of the body and be secured thereto by means of screws, nails or the like. Heel board 121 is usually made of stamped sheet metal. Seat back 122 comprises suitable wooden uprights 131 secured to and supported on the board 120. The upper ends of posts 131 are connected by one or more wooden frame members 132, and, at the back, certain uprights 131 support wooden cross members or slats 133 which afford a backing and support for the springs 123 and the upholstery. The back of this seat is covered by a panel unit 134 which is preferably constructed complete before being applied to the seat construction. Unit 134 may be a single piece or a plurality of pieces. The upper edge of this panel may be nailed to frame member 132, as at 135. The vertical edges of panel 134 may be nailed to the end uprights 131, as at 136. The lower edge of panel 134 may be nailed to the outer surface of seat board 120, as at 137. Obviously, if desired, the edges of panel 134 may be flanged inwardly so as to overlap the seat frame members. In this event these flanges may be nailed to the frame members, and in this way the nails by which the panel 134 is secured to the seat frame may readily be concealed by the upholstery.

When the type of body to be constructed, such as a sedan, requires a rear seat, this may also be provided as a separate and complete unit before assembling into final structure. As shown in Fig. 15, such unit comprises a pitched rear seat board or stool 138, to the under surface of which, near its front edge, is attached, by means of screws 139, a rear seat heel board 140. A metal or wooden riser 141 is attached adjacent its rear edge. Heel board 139 and riser 141 are adapted to rest upon floor boards of the body, and the lower ends of heel-board 140 are provided with notches 142 to interlock in notches 143 provided in panel members 10, and abutting and secured to flange 144 of member 10. A suitable back framework 145 is provided extending between and supported by floor boards and belt rail 20. Suitable springs, upholstery, padding and final covering (not shown) may be applied to this framework 145 in the ordinary manner. A cushion (not shown) of usual construction is also provided for this unit.

As a further illustration of a possible embodiment of my invention, I have also illustrated in the drawings the construction of an automobile body of the coupé type (Fig. 2). The construction of this type of body proceeds along the same lines as the construction described in connection with the sedan type of body. As above mentioned, by my method of building vehicle bodies, certain completely constructed units may be provided so as to be usable interchangeably in various different types of bodies. For instance, the identical completely constructed cowl panel unit 1 described above for use in the sedan type of body may be used for the coupé type of body, and be applied to the various frame members of the coupé body frame in the same manner in which this unit was applied to the body frame of the sedan type. Other units described above may also be used interchangeably in both the sedan and coupé types of bodies, their manner of application to the body frames of each type being the same. These units include the windshield header panel unit 2; front pillar panel units, such as 3; front door paneling 8, assembled upon suitable door framework; the panel unit 11 for the upper part of the rear of the body; the threshold panel units, such as 5; and the roof unit 14. Although the roof unit 14 of the coupé type of body is similar in construction and application to the roof unit 14 described for the sedan type, a difference in size may be required. All these units and their parts when they appear in the drawings as embodied in the coupé type of body are given reference numerals which are similar to the reference numerals applied to those units and parts when they are shown as embodied in the sedan type of body.

It is to be understood that my construction and method is not limited to bodies of the sedan and coupé type, but may be applied to and embodied in various other types of bodies. Consequently my invention is not limited to the construction and application of the body units described herein. Other interchangeable units may easily be provided.

As shown in the drawings, in addition to these interchangeable units above mentioned, I provide other panel units for the coupé type of body. One of these units is panel unit 146 (Fig. 26) for the lower part of the rear portion of the coupé type of body. This panel unit 146 is quite similar to the corresponding panel unit 4, for the sedan type of body, having front flanges 147 for attachment to the door posts 17 of the body frame, and bottom flanges 148 for attachment to sill 15. The rear portion of this unit 146 may be provided with the usual storage opening 149, which may be bounded on the inside by frame members 150 (Fig. 28), the panel being provided about the opening with one or more flanges 151 secured to frame members 150 by nails 27 or by other means. A separate panel member 152 may be provided to serve as a removable cover for this opening. Panel unit 146 may be formed in one piece by a stamping or forming operation, or it may be formed by assembling a plurality of stamped sheets of metal or other material together along moulding joints, such as 153, which are produced by overlapping panel sheets. Such joints and mouldings may be formed adjacent the rear corners of this panel unit, or the moulding may be formed by merely pressing the same in a one piece panel unit.

A preferred form of threshold strip 154 (Fig. 27) for the coupé body has an extended top flange 155 adapted to support floor boards. However, this strip may be similar to strip 5, (Fig. 7) if desired. A preferred form of seat unit for the coupé type of body comprises a seat board 156 (Fig. 29) adapted to rest along its rear edge on floorboards and having a heel board 157 attached along its front and side edges, the sides of the heel board being tapered to give the seat a pitched position. Heel board 157 has a top flange 158 for attachment to seat board 156 and a bottom flange 159 for attachment to floor boards. A cushion retaining strip 160 may also be applied about the front and sides of board 156. Framework 161 extends upwardly at the rear of board 156 to support upholstery, springwork, etc. (not shown), and bracing framework 162 is secured near the top of seat back 161 and to the rear framework of the body, and to belt rail 20 and rear posts 18.

The panel and other units are obviously susceptible of modification. As an example of a modification, instead of making the upper panel unit for the tonneau, as shown at 11, Fig. 12, to include the two sides, completely enclosing the rear side window opening 51, this unit may be formed as shown at 163, Fig. 46, so as to provide incomplete sides including only the rear portions of the rear side window openings 51. With such panel unit 1 provide separate panel units, such as 164, Fig. 47, to complete the sides and to supply vertical paneling 165 and horizontal paneling 166 for the front and upper sides of the window openings 51. The paneling for the lower corner and lower side of the window openings 51 is supplied by integral part 167 formed on a panel unit, such as 168, Fig. 45, for the sedan type of body, or a panel unit, such as 169, Fig. 52, for the coupé type of body. Except for paneling 167 this modified form of panel unit 168 may be exactly similar to the previously described panel unit 4 for the sedan body, and except for paneling 167, the modified form of panel unit 169 may be exactly similar to the previously described panel unit 146, Fig. 26, for the coupé type. These modified constructions of the rear paneling of both types of bodies is indicated by dot and dash lines 170 in Figs. 1 and 2. These panel units have attachment flanges, window retaining flanges and formed mouldings similar to those described in connection with panel units 4, 11 and 146, and bear similar reference numerals.

For the sedan type of body, instead of providing separate threshold strips for each doorway, I may provide a single threshold strip 171, Fig. 48, long enough to extend across both doorways or a side of the body, and recessed as at 172 for the lock post 19.

As shown in Fig. 46, panel unit 163 may have an upper horizontal flange 173 adapted to overlap and to be secured to a top frame member such as 25, Fig. 49. In this event flange 173 is preferably countersunk into this frame member so as to allow the roof rail, such as 101, to lie flat on the body frame member.

From the above description, my improved body construction, and the construction of the separate complete units, and the method of assembling the units and the body, will be clearly understood. It will be apparent that automobile bodies of any desired type may be constructed in accordance with this method. It is also apparent that the framework for the body may be constructed and assembled before the panel units and other units are assembled into the structure, or that the body frame may be supplied by various frame members which are provided separately and attached to the various panel units before the units are assembled in place on the body. The body frame and the construction and shape and size of the panel units are, of course, designed and formed to suit the particular type and size of body to be constructed. As above pointed out, many of these units may be so designed and constructed that they may be used in the construction of any one of several different types of bodies without requiring reflanging or reshaping or alteration of any kind. These units may be completely finished, even as to painting and enameling, before being assembled into the structure, and their assembly therein may be accomplished without danger of injury to their shape or finish. The construction above described clearly results in the advantages which have been specifically mentioned above, and in other advantages which will be readily apparent to those familiar with the art to which this invention pertains.

In furtherance of the object of building the several units of the work before the final assembly, the upholstery or trimming of the inside of the body is made in sections, according to the size, shape and design of the car, and then applied and secured in place.

By this means upholstery and trimming may be quickly and easily applied to the body. In accordance with this feature of my invention, the usual muslin, upholstery, padding and outside fabric covering material is attached to foundation sections, which may be sheets or strips of wood, cardboard, compo board, fibre board, or any other suitable material, and then these sections are attached to the interior of the body by suitable means, as nails, brads, tacks, or the like, and the covering material is picked out over the head of the brads or nails, so as to conceal them. In the application of these sections, however, this invention is not limited to the above method, since the sections of upholstery may be sprung into place and held by means of concealed hooks, wires, cords, flat spring steel or by other means. In Fig. 18 trimming is shown secured to the inner surface of the side rail 101 of the roof unit. The trimming material 174 is lapped over the upper edge of foundation section 175. This trimming is secured to the rail 101 by brad or nail 176, which has been driven through the material 174 and section 175 into the rail 101, and thereafter the trimming material 174 has been picked out over the head 177 of the nail 176 so as to conceal it. The trimming material 174, shown in Fig. 25 as being applied to the inner surface of the standing lock post 19, is secured in a similar manner by means of brads or nails 176 which have been driven through foundation 175 and the trimming material 174 overlapping its edges, and the trimming material has been picked out to cover and conceal the heads 177 of the nails 176. Whenever trimming material or similar elements are desired on the body, such elements may be applied in the manner illustrated and described.

Trimming and upholstery, such as 174 (Fig. 25) is also preferably applied to the inner surfaces of the door units in a similar manner, by means of foundation sections 175, before the doors are assembled in the final structure. As shown, the trimming material 174 on the doors and on the post 19 projects so as to overlap at the cracks at the doorways and thus conceals the same. By means of this method of applying the upholstery, trimming, and like elements, the usual method of applying wind lace for this purpose is avoided, as well as the necessity of applying separately lack gimp or weather stripping to conceal the means by which the upholstery, trimming, and like elements are secured in place. By my method much time is saved as well as the expense of employing skilled workmen.

As many changes could be made in the above construction and many apparently widely different embodiments of this invention could be made, and as many changes could be made in carrying out the above method, without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

What I claim is:

1. In vehicle body construction of the character described, in combination, a windshield header, and a panel unit therefor, said panel unit being pre-formed with a lower flange and side flanges to fit against the lower and end surfaces of said header, said flanges constituting means for securing said panel to said framework.

2. In vehicle body construction of the character described, in combination, a vertical post, a panel unit pre-formed to fit about the front and outer side of said post and having pre-formed flanges to fit along the inner and rear faces of said post, whereby the panel may be secured thereto, the lower edge of said panel having a pre-formed pressed-in moulding.

3. In vehicle body construction of the character described, in combination, a front post, a sheet metal cowl panel having a part of its upper edge fitting against and secured to the forward and outside faces of the post, and a sheet metal post panel fitting against the forward and outside faces of the post and overlapping the upper edge of the cowl panel at the post.

4. In vehicle body construction of the character described, in combination, posts, a sheet metal cowl panel pre-formed with portions at its rear corners to fit against the front and outer sides of said posts, and pre-formed panel units, one for each post, each unit having pre-formed flanges to fit along the inner and rear faces of a post, whereby the unit may be secured thereto, the lower edge of each unit having a pre-formed pressed-in moulding overlapping one of said rear corner portions of the cowl panel.

5. In vehicle body construction of the character described, in combination, a side sill, a post, a belt rail, and a panel unit pre-formed with a lower flange to fit against said side sill, with an edge flange to fit against said post, and with a flat upper edge to fit against the belt rail, said flanges and upper edge of the panel constituting means for securing said panel to said sill, post and belt rail.

6. In vehicle body construction of the character described, in combination, a side sill, and a sheet metal threshold panel pre-formed into channel shape in cross-section to receive the side sill snugly within the channel, the upper wall of said channel being pre-formed with a bead extending therealong.

7. In vehicle body construction of the character described, in combination, a side sill, a post extending upwardly therefrom, a threshold panel unit pre-formed into channel shape to snugly receive the side sill within the channel, and a panel unit for the post pre-formed into channel shape in cross-section to snugly receive said post in the channel, said threshold panel being cut away to receive said post and its panel.

8. In vehicle body construction of the character described, in combination, framework, including posts, a belt rail and a top rail, and a panel unit for the upper part of the rear portion of the body pre-formed with a top flange to fit against the top rail and with a pre-formed lower edge to overlap the belt rail, whereby said panel may be secured to said top rail and belt rail.

9. In vehicle body construction of the character described, in combination, framework, including posts, a belt rail and a top rail, and a panel unit for the upper part of the rear portion of the body pre-formed with a top flange to fit against the top rail and with a pre-formed lower edge to overlap the belt rail, whereby said panel may be secured to said top rail and belt rail, said panel also having pre-formed vertical edge flanges to fit against said posts, whereby said panel may be secured thereto.

10. In vehicle body construction of the character described, in combination, framework, including posts, a belt rail and a top rail, and a panel unit for the upper part of the rear portion of the body pre-formed with a top flange to fit against the top rail and with a pre-formed lower edge to overlap the belt rail, whereby said panel may be secured to said top rail and belt rail, said panel being pre-formed with a rear window opening and side quarter window openings.

11. In vehicle body construction of the character described, in combination, posts, side sills, a belt rail, a top rail, a lower panel unit for the back of the vehicle and the rear portions on each side, said panel having a pre-formed lower edge flange to fit against the sill and having a flat upper edge to fit against said belt rail, and an upper panel unit extending across the back and upper rear sides of the vehicle and pre-formed with an upper flange to fit against the top rail and having a preformed pressed-in moulding along its lower edge overlapping the upper edge of said lower panel unit, said panel units having pre-formed vertical flanges to fit against said posts.

12. In vehicle body construction of the character described, in combination, a frame member, a panel secured along an edge to said frame member, a retaining strip secured to said frame member overlapping the secured edge of said panel, and a second panel having a pre-formed pressed-in moulding overlapping said strip.

13. In vehicle body construction of the character described, in combination, a frame member, a body panel secured along one edge to said frame member, a retaining strip fastened to said frame member along said secured edge of said panel, and a second body panel having a portion conforming to the shape of said retaining strip, overlapping said strip, and secured thereto by means of spot welding, and said strip being counterbored at the places where said spot welding occurs.

14. In vehicle body construction of the character described, in combination, a frame member, a panel having a pre-formed pressed-in moulding, a retaining strip having bolt holes, bolts extending through said holes and having their heads countersunk in said strip, said panel at the moulding overlapping said strip and bolt heads and secured to said strip, said frame member having bolt holes whereby said panel with the strip and bolts secured thereto may be secured to said frame member.

15. In vehicle body construction of the character described, in combination, a frame member, a panel having a pre-formed pressed-in moulding, a retaining strip having bolt holes, bolts extending through said holes and having their heads countersunk in said strip, said panel at the moulding overlapping said strip and bolt heads and secured to said strip, said frame member having bolt holes whereby said panel with the strip and bolts secured thereto may be secured to said frame member, and a second panel having an edge secured against said frame member in position to be overlapped by said strip when secured to the frame member.

16. In vehicle body construction of the character described, in combination, a frame member, a panel having a pre-formed pressed-in moulding, a retaining strip having bolt holes, bolts extending through said holes and having their heads countersunk in said strip, said panel at the moulding overlapping said strip and bolt heads and secured to said strip, said frame member having bolt holes whereby said panel with the strip and bolts secured thereto may be secured to said frame member, and a second panel having an edge secured against said frame member in position to be overlapped by said strip when secured to the frame member, and having notches to receive the shanks of said bolts.

17. In vehicle body construction of the character described, in combination, side sills, a floor board supporting panel secured to each side sill and having an inwardly directed flange along its lower edge, a rear seat member, including a seat board and a front riser therefor, the ends of said riser resting on said flanges of said floor board supporting panels.

This specification signed this 18th day of September, 1922.

CONRAD T. HANSEN.